Sept. 20, 1966     K. EICKMANN     3,273,342
ROTARY VANE COMBUSTION ENGINE
Filed July 22, 1963     10 Sheets-Sheet 1

INVENTOR
*KARL EICKMANN*

ATTORNEY

Sept. 20, 1966      K. EICKMANN      3,273,342
ROTARY VANE COMBUSTION ENGINE

Filed July 22, 1963      10 Sheets-Sheet 4

INVENTOR.
KARL EICKMANN
BY

Michael J. Striker

Sept. 20, 1966 K. EICKMANN 3,273,342
ROTARY VANE COMBUSTION ENGINE
Filed July 22, 1963 10 Sheets-Sheet 5

INVENTOR.
KARL EICKMANN
BY
Michael J. Striker

Sept. 20, 1966 K. EICKMANN 3,273,342
ROTARY VANE COMBUSTION ENGINE
Filed July 22, 1963 10 Sheets-Sheet 6

INVENTOR.
KARL EICKMANN
BY
Michael J. Striker

Sept. 20, 1966  K. EICKMANN  3,273,342
ROTARY VANE COMBUSTION ENGINE
Filed July 22, 1963  10 Sheets-Sheet 7
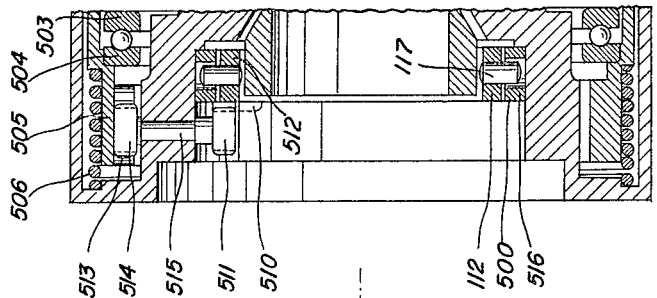
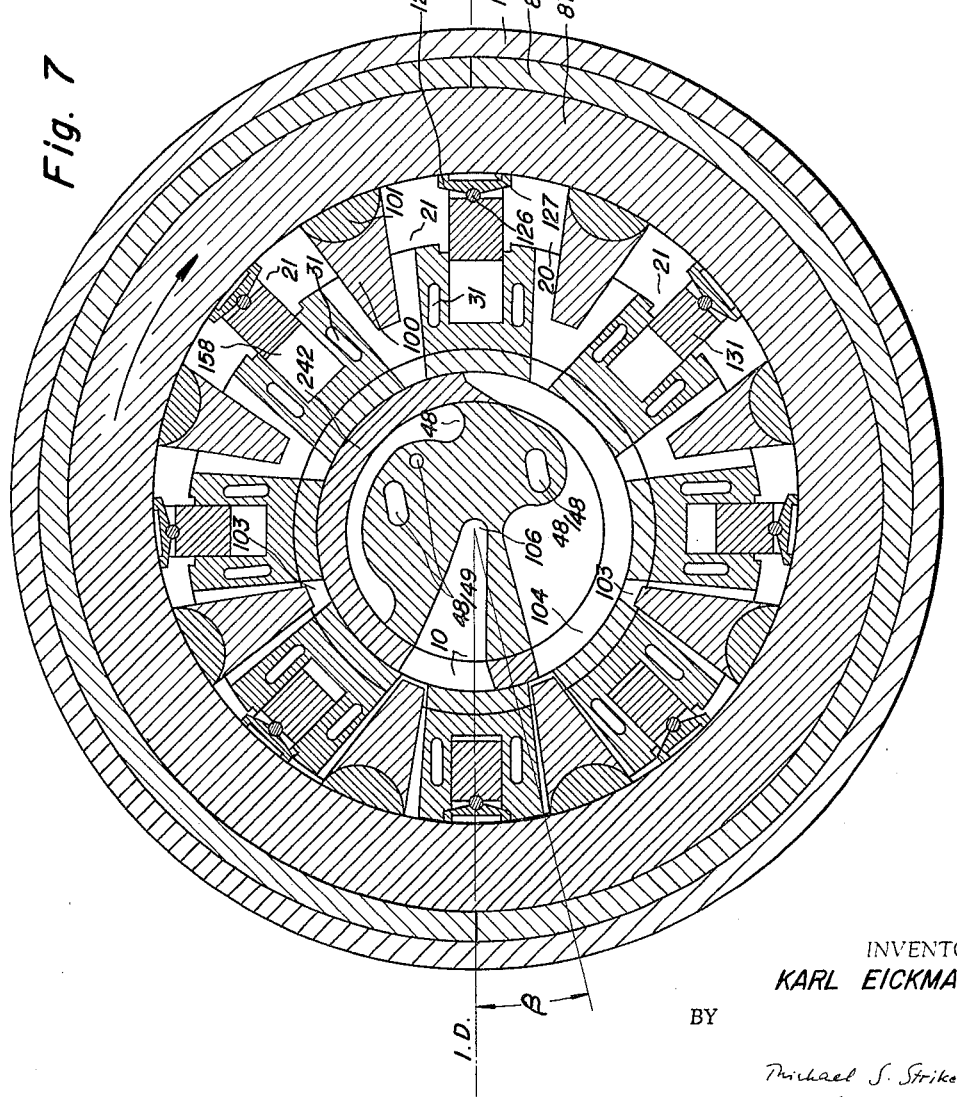
INVENTOR.
KARL EICKMANN
BY
Michael S. Striker Sept. 20, 1966 K. EICKMANN 3,273,342
ROTARY VANE COMBUSTION ENGINE
Filed July 22, 1963 10 Sheets-Sheet 8

INVENTOR
KARL EICKMANN

BY

ATTORNEY

Sept. 20, 1966 K. EICKMANN 3,273,342
ROTARY VANE COMBUSTION ENGINE
Filed July 22, 1963 10 Sheets-Sheet 9

INVENTOR
KARL EICKMANN

ATTORNEY

Sept. 20, 1966  K. EICKMANN  3,273,342
ROTARY VANE COMBUSTION ENGINE
Filed July 22, 1963  10 Sheets-Sheet 10
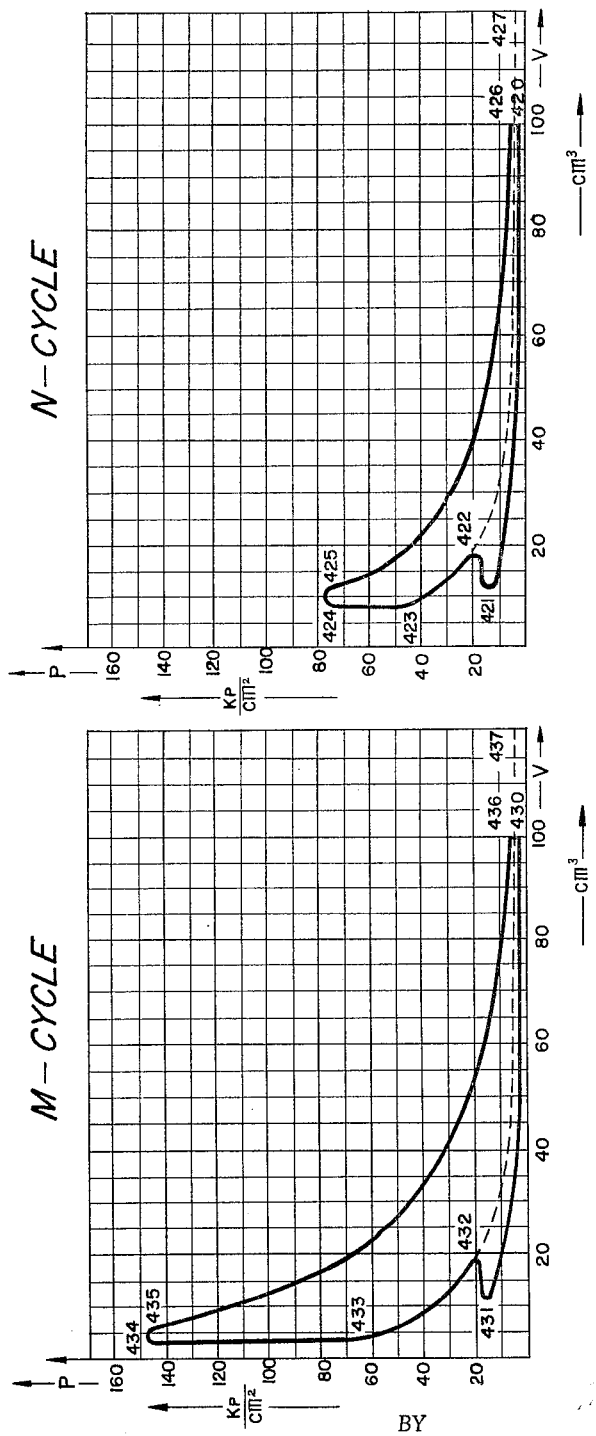
INVENTOR
KARL EICKMANN
ATTORNEY 3,273,342
ROTARY VANE COMBUSTION ENGINE
Karl Eickmann, 2420 Isshiki Hayama-machi,
Kanagawa-ken, Japan
Filed July 22, 1963, Ser. No. 296,583
Claims priority, application Germany, July 23, 1962,
E 23,244
19 Claims. (Cl. 60—39.63)

The present invention relates to a rotary vane internal combustion engine which is provided with means for adjusting the timing of the feeding of the working gases into the working chambers of the engine and/or of their discharge from these chambers relative to their outer or inner dead-center positions.

In my copending U.S. application Serial No. 123,384 and in my application in Switzerland No. 7923/60 as well as similar applications in other countries it has been disclosed that a control shaft may be suspended in the central bore of the rotor or rotors so as to be able to oscillate therein and to be movable spherically but to be locked against rotation about its own axis. The fresh air or the combustible mixture will be supplied to and discharged from the compressor of the engine through the control shaft, or the compressed gas or combustible mixture will be conducted through the control shaft out of the compressor or into the motor or expander, and/or the burned and partly or entirely released gas will be discharged from the motor rotor. Since the control shaft cannot rotate about its own axis, the working medium always passes at certain angles either before or after the inner or outer dead-center positions of the working chamber from the control shaft into the rotor or from the respective rotor into the control shaft depending upon the particular construction of the parts in the rotors and the control shaft. The ignition and combustion of the mixture occurs in accordance with the particular construction either in the control body or control shaft or in the working chambers of the rotors or in both. It is also already known that the ignition and/or the combustion may occur substantially simultaneously or successively in the compressor or the control shaft and/or the motor, depending upon the construction of the combustion engine. If, for example, the combustion engine is of a very high-speed type, the time for the combustion of the fuel in the air may be too short to occur only in the motor. In such cases, a small quantity of fuel is mixed with air prior to the compressor or in the compressor and partly burned in the compressor, so that in the motor and/or in the control shaft only a remaining part of the mixture is burned. However, in all of these cases the passage of the gases from the stationary control shaft to the rotors or vice versa occurs at certain angles prior to or after the outer or inner dead-center positions.

The present invention is based primarily upon the recognition of the fact that at a given speed of the engine the mixing and/or the ignition and/or the combustion of mixtures of fuel and air must occur at certain constant times in the combustion chamber, in the rotor chamber, or in the rotor working chambers. In previous combustion engines of this type this disadvantage had the result, especially at very high speeds of the rotor or rotors, that the period during which the mixture was in the motor was insufficient to insure a complete combustion. Parts of the mixture therefore escaped unburned through the exhaust or burned up in the exhaust channels. If, however, in order to overcome this disadvantage the mixture was brought to a combustion very long prior to the inner dead-center position, kickbacks occurred uniformly as in motorcycles with piston engines especially at the start and/or at low speeds which tended to turn the rotor or rotors suddenly in reverse. In connection with the present invention the finding is also of importance that the combustion is influenced to a considerable extent by the speed of the rotors and that the ports in the control shaft should be located in different positions relative to the dead-center axis of the engine when the engine runs at low speeds than when it runs at high speeds.

It is therefore an important feature of the present invention that the control shaft be mounted in the central bore of the rotor or that the control body or control shaft be mounted at the axial ends or at one axial end of the rotor or rotors so as to permit it to be turned about its axis. According to the invention, it is especially effective if the control body is turned in a certain relation to the speed of the rotor or rotors, for example, by hand by the person who operates the engine. If this turning is carried out automatically in relation to the rotor speed by means of a speed-controlled apparatus, for example, by conventional elements which are controlled by centrifugal force, a mechanism will be actuated so as to turn the control body. Since the control body is preferably suspended in a gimbal ring, it is advisable simply to turn the gimbal ring in relation to the rotor speed, possibly through suitable intermediate elements. The turning may be carried out on the control shaft which controls the compressor or on the control shaft which controls the motor or on a combined control element which controls both the compressor and the motor. If such a control element which also controls the motor is turned in accordance with the invention, it will at increasing speeds of the motor generally be turned in the direction opposite to the direction of rotation of the motor. This has the result that at lower speeds the control port through which the gas is passed into the motor will be closed behind the inner dead center. Any reverse turn of the motor due to gas mixtures suddenly burning up in the chambers thereof is thus prevented since the expansion or releasing forces behind the inner dead center always act in the normal direction of rotation of the motor. At very high rotor speeds, however, the control element will be turned so far in reverse to the direction of rotation of the rotor that the control port through which the gas is passed into the motor will be disposed in a position in front of or even at a very large angle in front of the inner dead center of the motor chambers. This has the advantage that until this working chamber reaches the inner dead center, the mixture in the working chamber of the motor will have a certain length of time in which it may ignite or partly burn up. The full releasing effect of the combustible mixture may then become effective shortly after the inner dead center even at very high speeds. A combustion engine according to the invention has an especially high efficiency if the turning of the control element as described is infinitely variable in such a manner that at any particular speed of the motor, the control ports will be in such a position that as soon as the inner dead center is passed, the expansion forces of the gases will become effective as completely as possible in the respective working chamber and the combustion will occur as completely as possible.

Similar effects may also be attained if the motor is controlled by turning the control body or shaft. Also with combined control bodies for acting upon the compressor and the motor, it is possible to attain an effect which very favorably influences the combustion and the kinematics of the engine.

By turning the control body in accordance with the invention, it is, however, possible to control not only the combustion time and the time of the closing of the working chambers, but also the compression and releasing conditions themselves. Thus, for example, it is possible at low speeds and at the start of the engine to attain a low compression ratio in the compressor, while at high speeds the compression ratio in the compressor may be made very high. This control of the compression ratios is determined by the position of the control ports in the control body relative to the connecting line between the dead centers of the combustion engine. Finally, it is also possible by means of the inventive control to achieve that at low speeds the compression will only occur in the compressor and the release or expansion only in the motor. At high speeds, however, the control element may be turned in such a manner that a part of the further compression will occur in the motor, that is, prior to the inner dead center, while the release occurs in the motor after passing beyond the inner dead center. When speaking of the inner dead center this is supposed to mean that position of the particular working chamber in which this chamber has its smallest volume.

By means of the present invention it is therefore possible to start the engine at a low expenditure of energy and without any kick-back and to operate it at any speed with the most suitable compression ratio and the most complete combustion, and at high speeds at increased pressures and at an early start of the combustion. This not only permits the engine to operate very economically, but it also results in an increase of the maximum speed and of the maximum output of the engine. Especially it is also possible to combine a constant-volume combustion and a constant-pressure combustion with each other into a mixed combustion process or to carry out the different combustion processes successively and thus to attain a very high efficiency of the engine.

The features and advantages of the invention will henceforth be further described with reference to the accompanying drawings, in which all those parts which are already described in my prior U.S. application, Serial No. 123,384 and in my application in Switzerland No. 7923/60 are also identified by the same reference numerals and therefore do not need again to be described. Therefore, only those parts are hereafter particularly described and identified therein and in the drawings by new reference numerals which are not disclosed in my previous application. Those parts in the different drawings which are new but serve an equal purpose are identified by the same numerals.

In the drawings,

FIGURE 7 shows a cross section similar to FIGURE 3, but with the control body turned in the counterclockwise direction;

FIGURE 8 shows a cross section which is taken along the line VIII—VIII of FIGURE 1;

Figure 10:
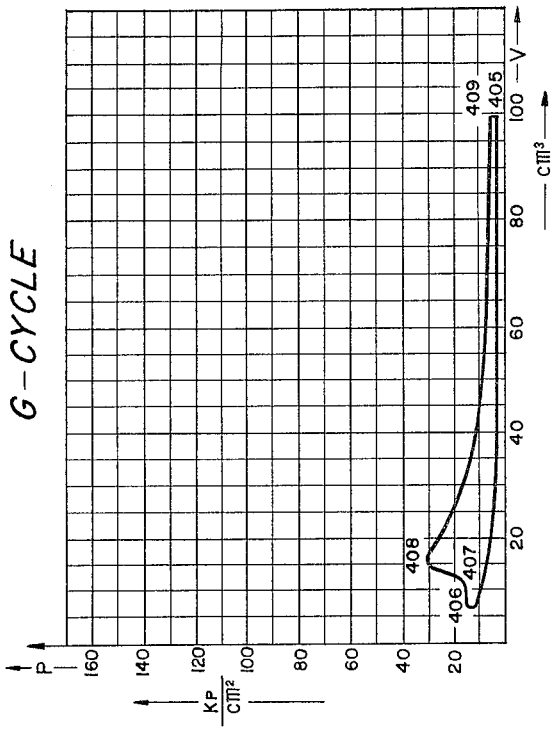
Figure 9:
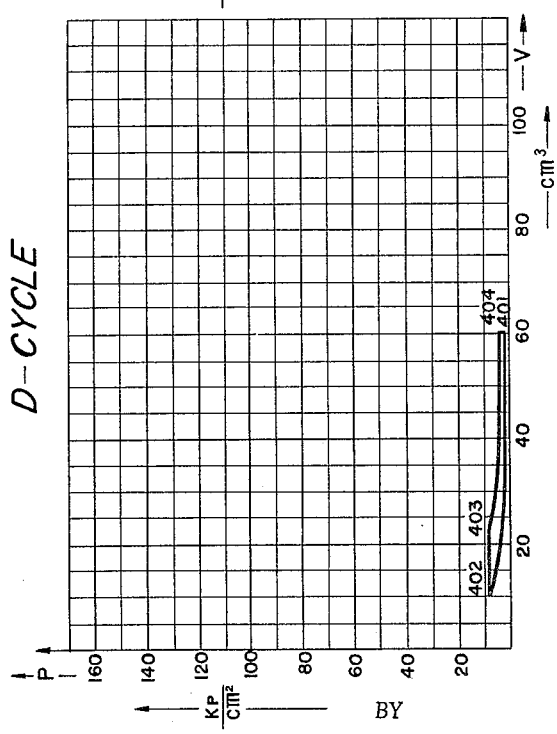
Figure 12:
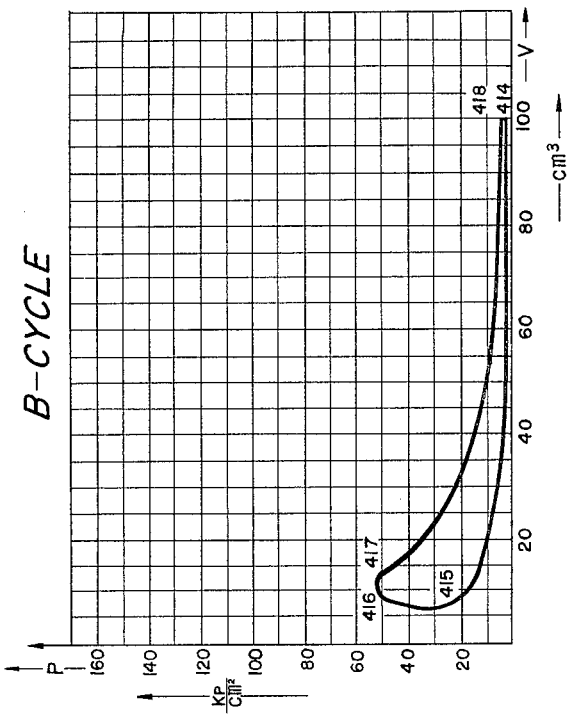
Figure 11:
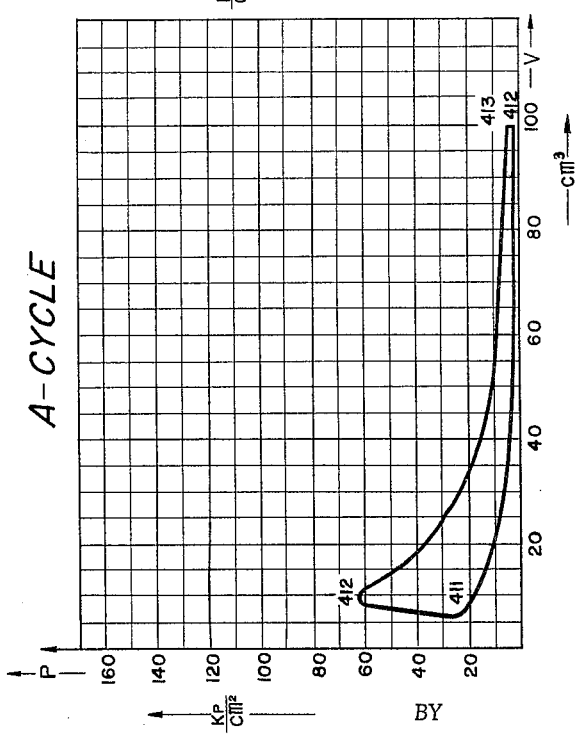

FIGURE 9 shows a combustion diagram;
FIGURE 10 shows another combustion diagram;
FIGURE 11 shows a third combustion diagram;
FIGURE 12 shows a fourth combustion diagram;
FIGURE 13 shows a fifth combustion diagram; while
FIGURE 14 shows a sixth combustion diagram.

FIGURES 1 to 8 of the drawings illustrate parts of an internal combustion engine which correspond to those as shown and described in my copending U.S. application, Serial No. 123,384, and in my application in Switzerland, No. 7923/60, and in similar applications in other countries, and which are adapted to carry out the functions as described in these earlier applications. These corresponding parts are:

1 the fuel injection line,
2 the induction channel,
3 the induction socket,
4 and 5 cooling means,
6 a cooling medium line,
7 compressor ports,
8 a housing base,
9 inlet port of the central chamber (FIGURE 2),
10 outlet port of the central chamber (FIGURE 3),
11 rotor bolts,
12 nuts of rotor bolts,
13, 14, 15 and 16 radial bearings,
17 outer rotary housing ring,
18 and 19 lateral hubs thereof,
20 compressor working chambers,
21 motor working chambers,
22 a compressor hub,
25 cooling chambers,
26 and 33 rotor partitions,
27 and 32 rotor side walls,
28 bearing ring of the compressor,
29 casing ring of the compressor,
30 compressor rotor,
31 cooling-medium channels in rotor,
34 a cooling chamber,
35 and 41 sealing-medium channels,
42 and 43 valve balls and springs therefor,
44 and 81 compensating channels for motor rotor,
45 channel for sealing medium,
46 collecting channel for sealing medium,
47 passage for sealing medium,
48, 49, 50 and 51 cooling chambers,
52 cooling medium line,
54 washers,
53 and 89 rotor compensating channels in the compressor,
61 connecting line to rotor balancing area,
63 connecting line,
68 injection nozzle,
69 flame,
70 combustion chamber,
71 ignition device,
72 induction control port,
78 control shaft of engine,
79 and 80 compensating channels in motor,
82 motor rotor,
83 and 84 side walls of motor rotor,
85 outer lateral hub of motor,
86 left hub of motor which may also form right hub of compressor,
87 motor casing ring,
88 motor bearing ring,
37, 38, 94, 95, 96, 97, 98, and 99 balancing areas,
91 and 117 plastic sealing rings,
100 filler blocks in motor for filling out dead spaces,
101 skids of filler blocks 100,
102 rotor ports in motor rotor,
103 ports in rotor sleeve,
104 and 105 motor control ports,
106 gas exhaust channel,
110 and 111 pivot pins,
115 cover of rotor balancing chamber,
116 rotor balancing chamber,
125 vane guide runners,
126 pivot pins,
131 vanes,
123 and 124 axial vane extensions,
127 balancing areas in vane skids,
158 slots of rotor 30 within vanes,
159 slots in rotor radially outside of vanes,
163, 164 and 185 cooling chambers,
182 exhaust manifold,
184 spline on engine shaft, 186 engine shaft,
190 flame, and
242 control bushing.

The functions of the above-listed parts do not need to be described in detail since they are adequately described in some of my earlier patent applications, for example, in the mentioned U.S. application, Serial No. 123,384 and my Swiss application No. 7923/60.

According to the present invention, the internal combustion engine is provided with a control mechanism 500 for regulating the timing. In the embodiment of the invention as illustrated this control is effected automatically by centrifugal force by the elements 501 which are mounted in bearings 502 and act through the rotatable thrust-bearing race 503, the stationary race 504, and the thrust bearing 505 upon the compression spring 506. Thrust bearing 505 is guided on the supporting member 508 by means of one or more splines 507 and the associated keyway or keyways 509. The control mechanism 500 further comprises a part 510 having gear teeth, a gear 511, a rack 512 with rack teeth 513 thereon, a gear 514, a shaft 515 and other parts (FIGURE 8).

The medium, for example, air or a mixture of fuel and air is drawn in a known manner into the control shaft 78 through the induction channel 2 in the control shaft, and it passes out of the control shaft through the control port 72 and then through the rotor ports 7 of the compressor rotor into the compressor chambers 20. The compressor together with all of the rotatable parts of the engine are then in rotation. All of the rotor parts revolve concentrically, whereas the casing rings and the parts carrying the same, i.e. the parts 17, 18, 19, 28, 29, 87 and 88 run eccentrically to the rotor axes. This results in the formation of the working chambers 20 in the compressor (FIGURE 2) and working chambers 21 in the motor (FIGURE 3), the volume of which increases and decreases periodically during the rotation. In the cross-sectional drawings, FIGURES 2 to 8, the plane of eccentricity which extends from the inner dead center to the outer dead center is indicated between the points I.T. and O.T., wherein I.T. means the inner dead center and O.T. the outer dead center. The medium flows into the compressor chambers 20 in the manner as described until during the respective part of the rotation the chambers 20 increase in volume. When the respective chambers have passed through their outer dead-center position, their volume starts to decrease. This results in a compression of the medium in chambers 20 which, after the slot-shaped connection is formed during the rotation of the rotor between the rotor port 7 and the inlet port 9 flows through the central chamber or combustion chamber 70. In this central chamber 70, fuel may also be supplied to the medium. Depending upon the particular construction of the engine, the combustible mixture may also be ignited in the central chamber 70 and the combustion may also occur therein although this is not absolutely necessary After the medium has passed through the central chamber 70, it emerges therefrom and from the control shaft through the outlet port 10 and passes into the rotor ports 102 of the motor. In this flow, the medium may also pass through the ports in the rotor bushing. The medium then flows in the usual manner through the motor rotor ports 102 into the working chambers 21 of the motor and expands therein until the respective chamber has reached its greatest volume at the outer dead center. Thereafter, the medium leaves the respective working chamber 21 of the motor through the respective rotor sleeve port 103 and the motor control port 104 in the control shaft 78, and it then passes through the exhaust channel 106 out of the control shaft and through the branch line 183 into the exhaust manifold 182 from which it may pass to an exhaust gas turbine or escape to the outside or be conducted away to carry out other work. In my mentioned earlier applications it has already been described that the combustible mixture or air alone may be conducted to the compressor and also that a constant, continuous, or intermittent combustion may occur in the combustion chamber. I have also previously described that the feeding or injection of the gas or the combustion thereof may according to the particular construction of the engine be started or partly or completely carried out in the compressor, in the individual compressor chambers, in the central chamber, in the combustion chamber, or in the motor or the working chambers of the motor.

In the engines of the above-mentioned types which have been previously designed, the control shaft 78 is already freely suspended in a gimbal ring and locked therein against rotation. However, in all of these examples as already described the rotor ports 7 of the motor, the outlet ports of the central chamber 10, and the control ports 104 of the motor are arranged at certain constantly fixed angles to the plane of eccentricity.

Figure 1:
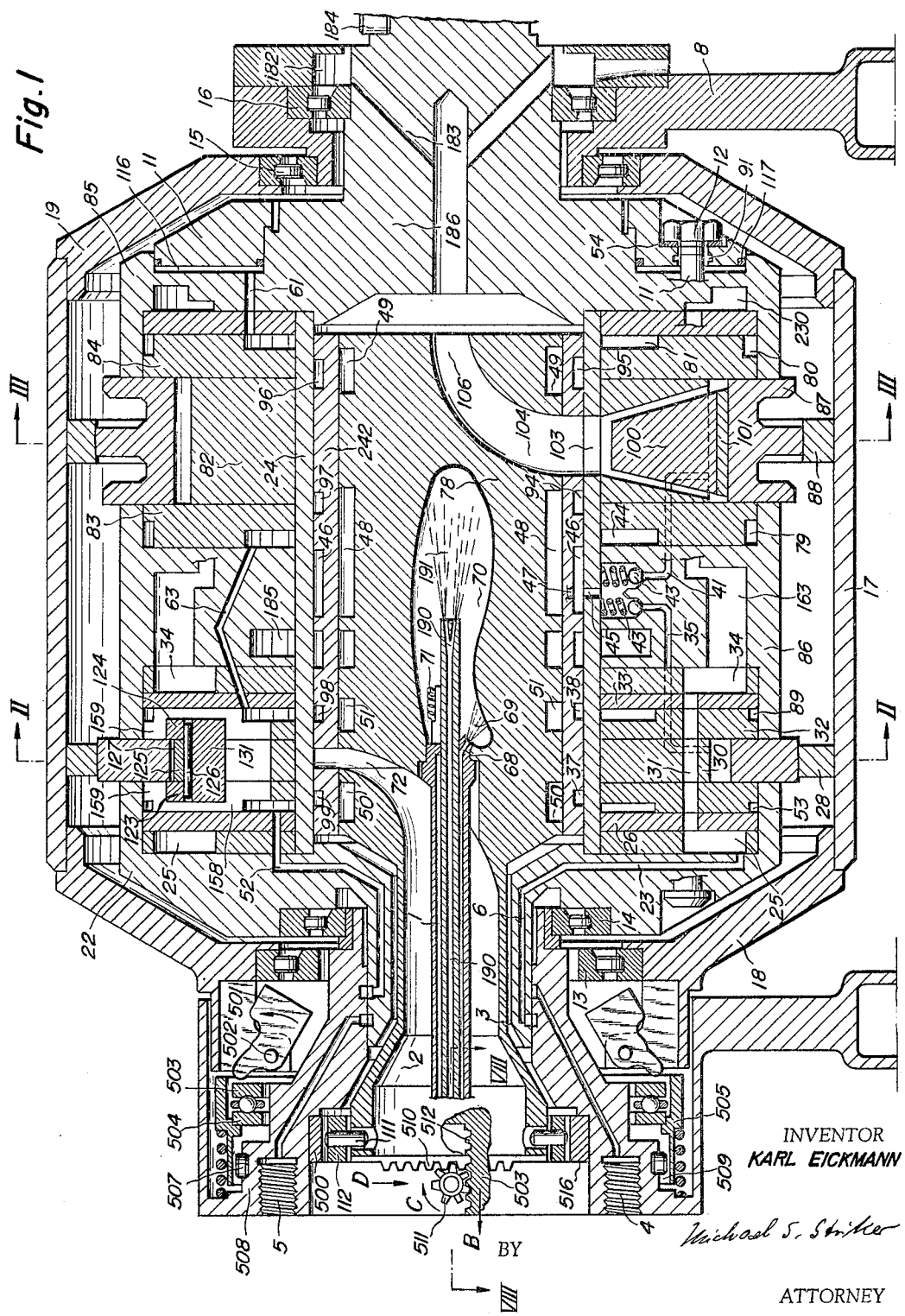
FIGURE 1 shows a longitudinal section of an internal combustion engine of a known type which is provided with a built in control body according to the invention.

According to the present invention, however, the control shaft 78 is mounted in the control supporting member 508 so as to be turnable about its axis by the control mechanism 500. The control shaft 78 may for this purpose be mounted in the supporting member 508 and be adjustable by being turned by hand by the control mechanism 500 or automatically, for example, in response to the engine speed, or mechanically, electrically, hydraulically, or in any other suitable manner. The particular embodiment of the invention as illustrated in FIGURES 1 and 8, in which the control shaft 78 may be turned about its axis in response to the engine speed merely constitutes one example of the different manners in which the control may be carried out.

According to FIGURES 1 to 8, the control shaft 78 is held in the gimbal ring 112 by means of the diametrically arranged pivot pins 111, and the gimbal ring 112, in turn, is mounted in the turning ring 516 by the gimbal ring pins 110. Ring 517 is mounted in the supporting member 508 and may be turned to a limited extent about its axis by the control mechanism 500. The simplest form of such a control mechanism 500 would be a simple hand lever which may be flanged, screwed or welded to the turning ring 516. Since such a construction employing a hand lever is obvious and may be of different designs, it is not illustrated in the drawings.

If the timing control mechanism 500 is to be automatically controlled in response to the engine speed, as illustrated in FIGURES 1 to 8, the turning ring 516 is mounted so as to be rotatable about its axis in the supporting member 508. Ring 516 is provided with gear teeth 510 with which a gear 511 engages which is secured to one end of shaft 515. This shaft 515 is rotatably mounted in the supporting member 508 and carries on its other end a gear 514 which engages with a rack 512, 513 which is mounted on the thrust bearing 505. This thrust bearing 505 is mounted in or on the supporting member 508 and is adjustable in the axial direction. When the thrust bearing 505 moves in the axial direction, this axial movement is converted into a corresponding rotary movement by the gears and gear parts, racks, and pinion 510 to 515, and the turning ring 516 is thereby turned about its axis. Since the extent of the axial movement of thrust bearing 505 is limited, the rotary movement of the turning ring 516 is also limited. Usually this mechanism is designed so that the axial movement of the thrust bearing 505 permits the turning ring 516 to be turned back and forth from its central position.

Thrust bearing 505 contains at the end facing the engine a ball or roller bearing, which consists of a stationary race and a rotatable race. FIGURES 1 and 8 show that the stationary race 504 of this bearing is mounted in or on the thrust bearing 505 and that the race 503 is thus able to rotate along the stationary race 504 by means of balls or rollers and to transmit forces thereto. A plurality of centrifugal weights 501 are pivotably mounted on pins 502 within a rotatable part of the engine, for example, on a rotor side wall or side walls or, as shown in FIGURE 1, within radial slots in the side wall 18 of the rotatable supporting ring 17. When the supporting ring 17 of the engine rotates, the centrifugal force acts upon the weights 501 and tends to pivot them radially toward the outside. Each weight 501 has a projection thereon which transmits the radial forces and the resulting pivoting movements which are produced by the centrifugal action in the form of axial forces and movements to the rotatable bearing race 503. The number and weight of these centrifugal weights 501 depends upon the axial forces which should be exerted upon the bearing race 503. Of course, all of these parts are not limited to the particular construction as illustrated and may be considerably modified without departing from the scope of the invention.

The axial forces which are exerted upon the rotatable bearing race 503 are opposed by a compression spring 506 which may be mounted, for example, between the supporting member 508 and the stationary race 504 of the thrust bearing 505. The play of forces which occurs determines the position of the thrust bearing 505 and thus the position of the turning ring 516 and the control shaft 78. It will thus be seen that, in the particular embodiment of the invention as illustrated in FIGURES 2 to 14, the greater the speed is at which the rotor parts of the engine are rotated, the more will the control shaft 78 be turned in the counterclockwise direction.

Figure 2:
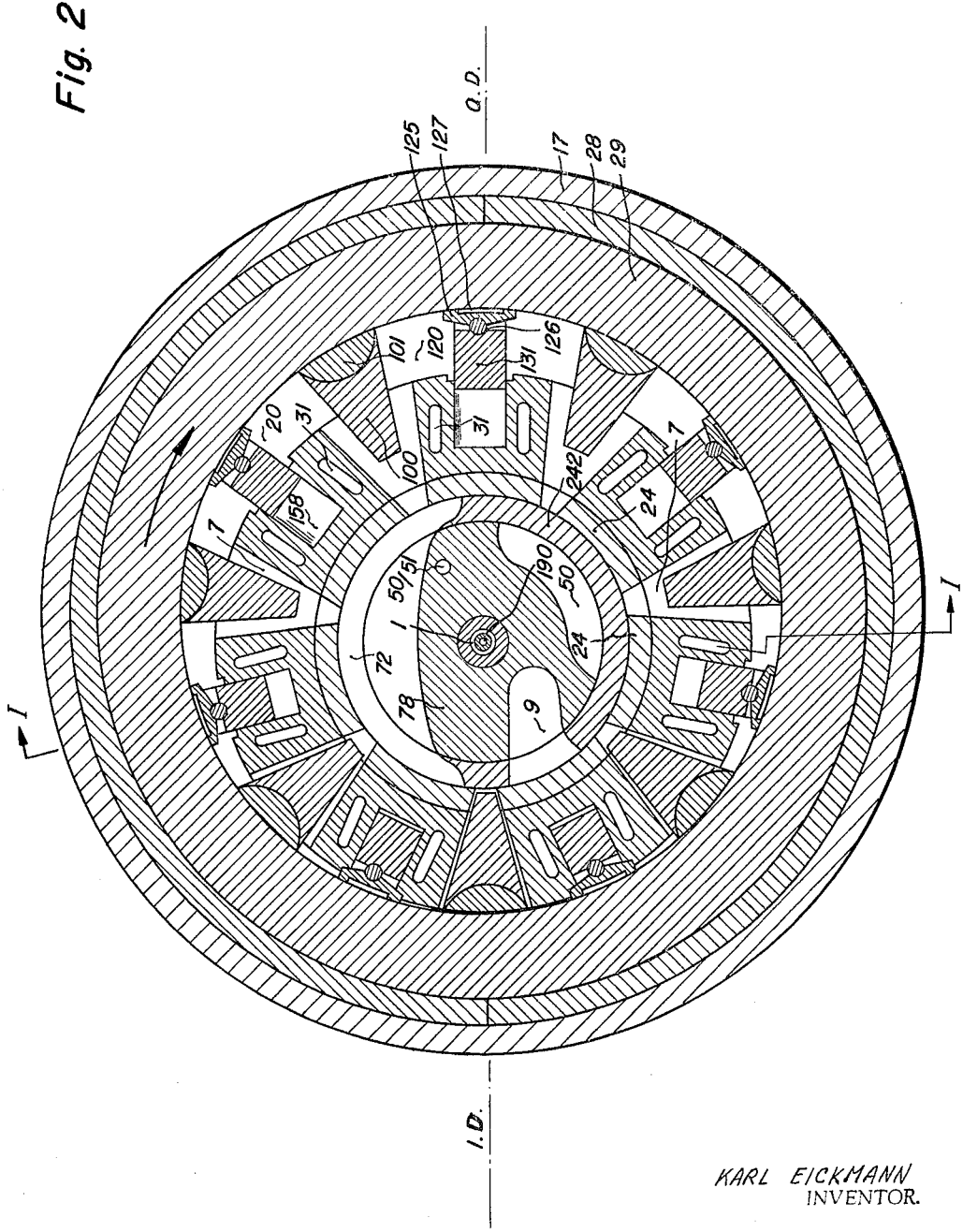
FIGURE 2 shows a cross section which is taken along the line II—II of FIGURE 1.
Figure 3:
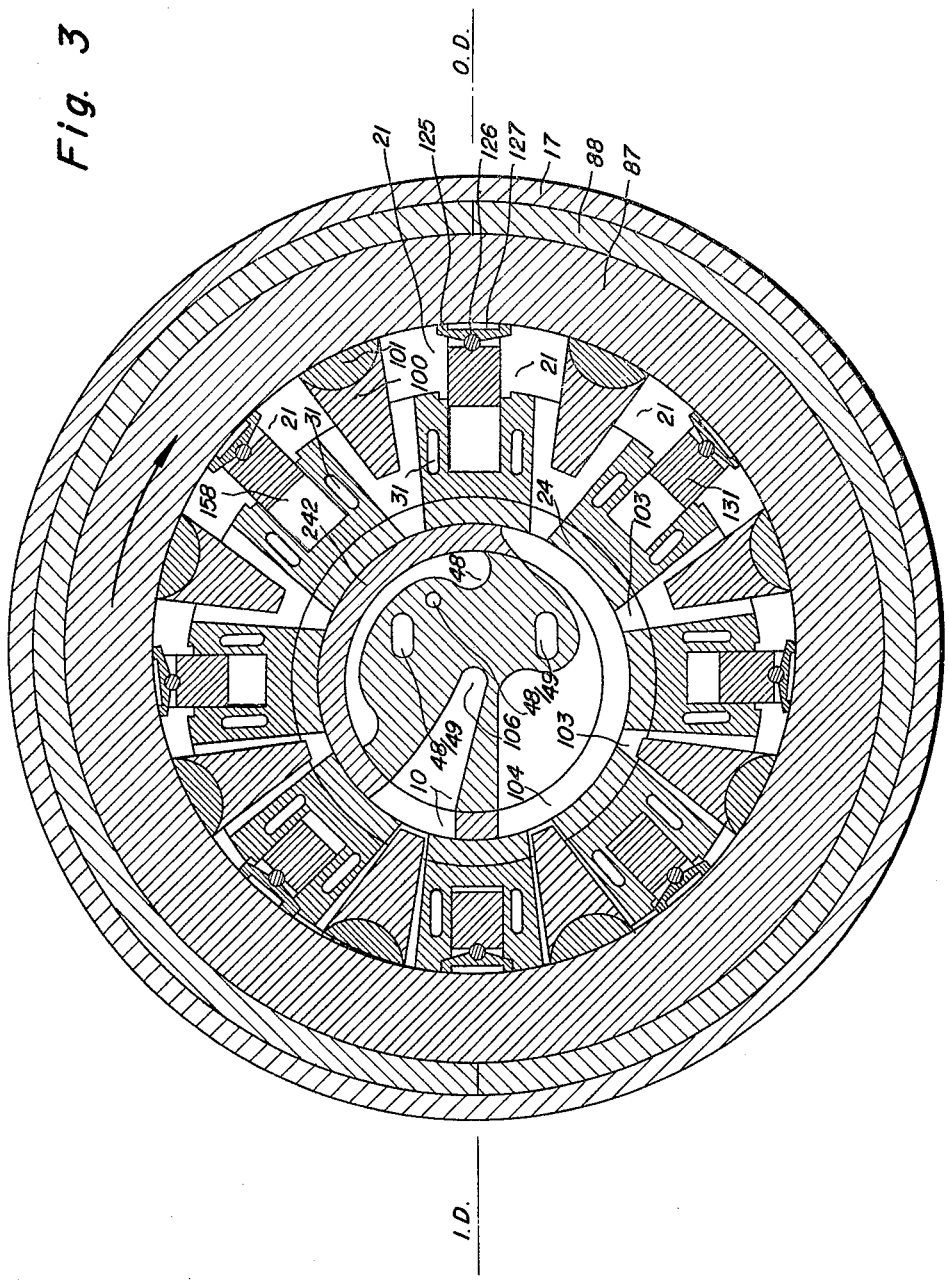
FIGURE 3 shows a cross section which is taken along the line III—III of FIGURE 1.
Figure 4:
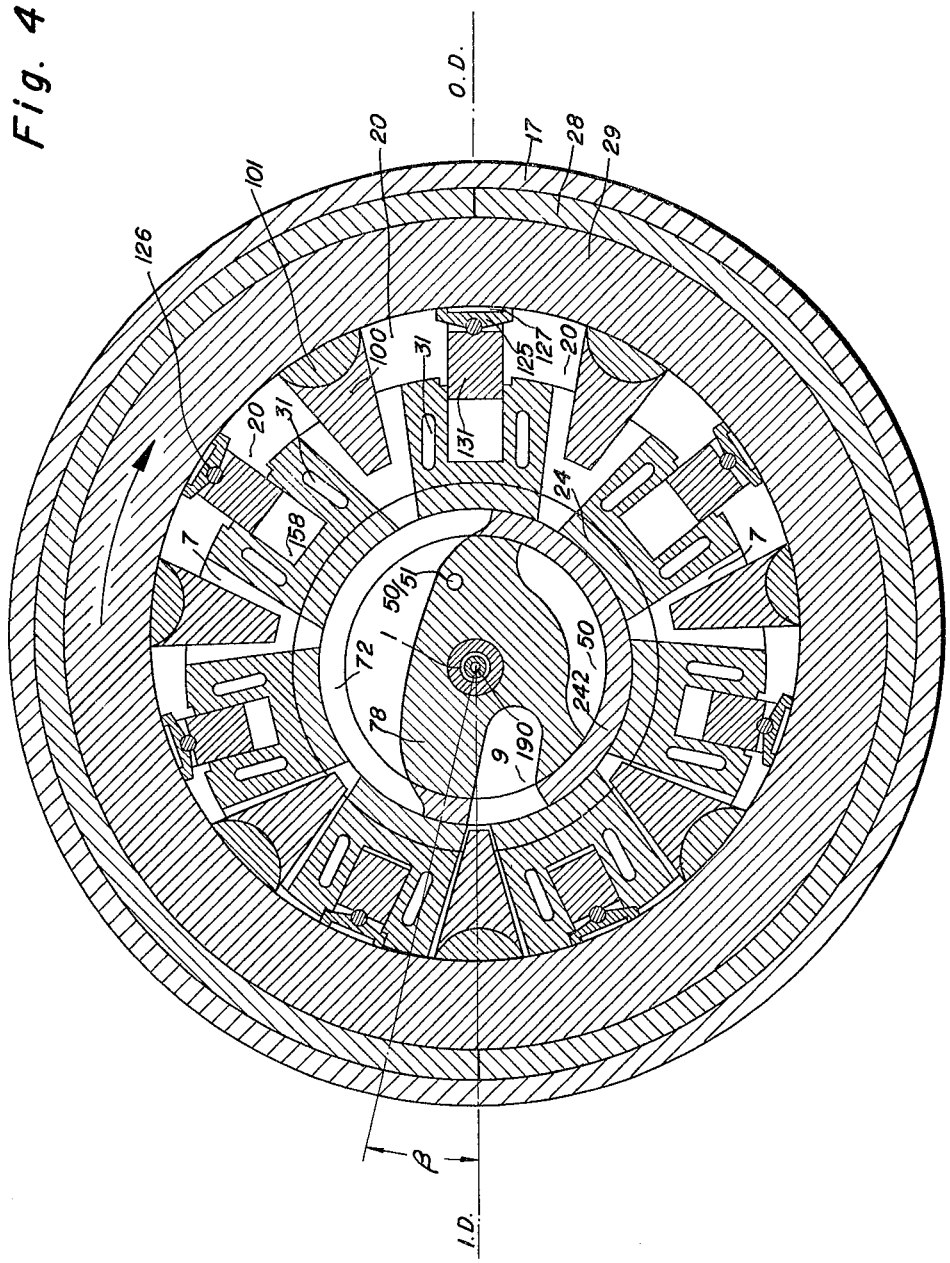
FIGURE 4 shows a cross section similar to FIGURE 2, but with the control body turned in the clockwise direction.
Figure 5:
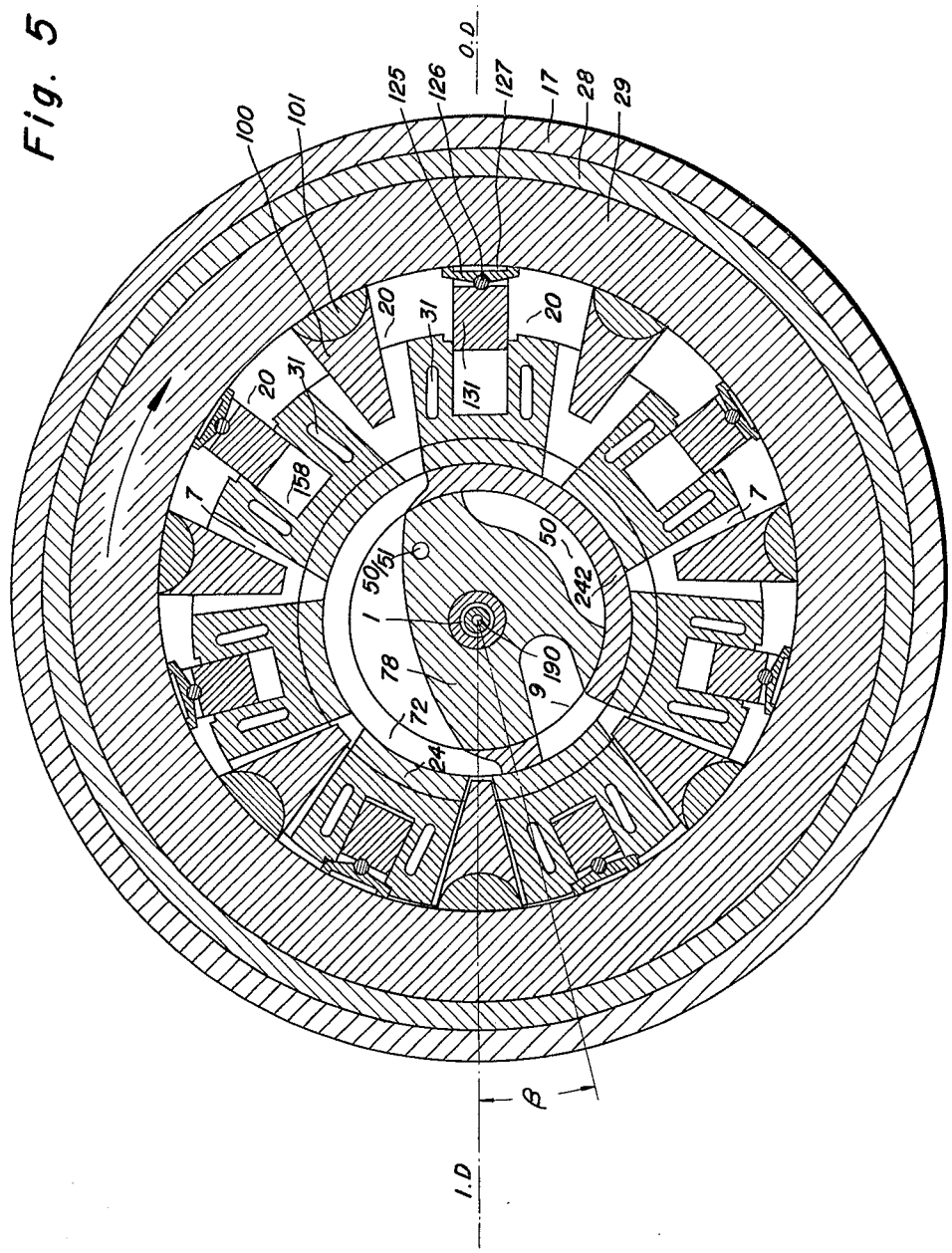
FIGURE 5 shows a cross section similar to FIGURE 2, but with the control body turned in the counterclockwise direction.
Figure 6:
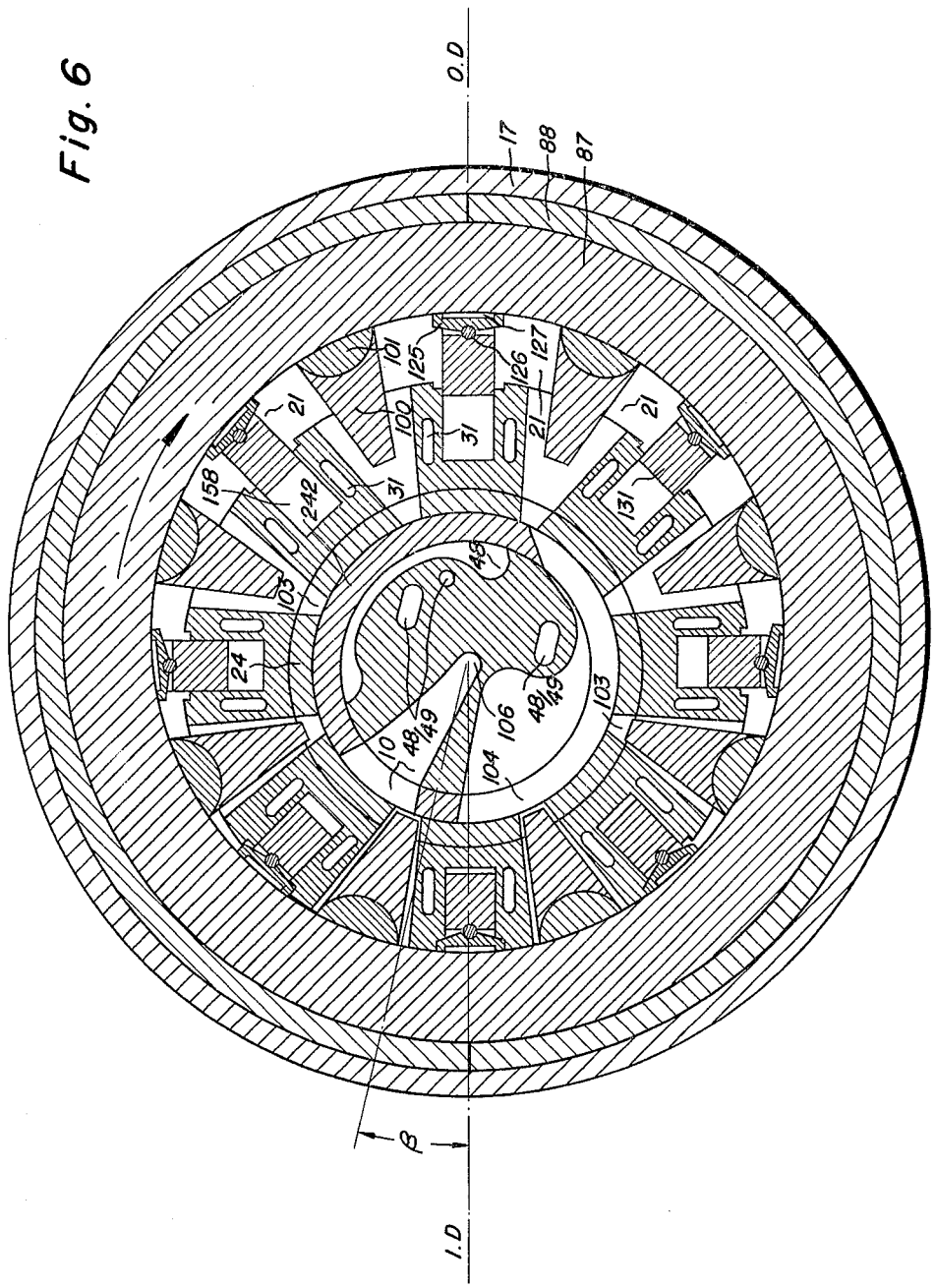
FIGURE 6 shows a cross section similar to FIGURE 3, but with the control body turned in the clockwise direction.

FIGURES 2, 4 and 5 show cross sections through the connecting channels between the cooling chambers 50 and 51, while FIGURES 3, 6, and 7 show cross sections through the connecting channels between the cooling chambers 48 and 49. The shape, construction, and position of these connecting channels as shown in these drawings may, however, be modified considerably in accordance with the particular construction of the engine.

In FIGURE 2, the control shaft 78 is located in a neutral position relative to the plane of eccentricity O.T.—I.T., whereas in FIGURE 4 the control shaft 78 is shown as being turned about the angle $\beta$ in the clockwise direction and in FIGURE 5 about the angle $\beta$ in the counterclockwise direction. In these drawings, the arrow indicates the clockwise direction of rotation of the rotatable parts. FIGURES 2, 4, and 5 illustrate that, when the control shaft 78 is turned, the positions of the induction control port 72 and of the inlet port 9 of the central chamber change with respect to the plane of eccentricity. In the normal position according to FIGURE 2, the induction port 72 begins slightly forwardly of the plane of eccentricity in the vicinity of the inner dead center I.T. In FIGURE 4, the beginning and the end of the induction port are turned in the clockwise direction about the angle $\beta$ so that the beginning of the induction port is located at a greater distance from the inner dead center I.T., while the end of this port lies even forwardly of the outer dead center O.T. In FIGURE 5, the reverse is true so that the beginning of the induction port is located at the rear of the inner dead center I.T. and the end of this port is located even at the rear of the upper dead center O.T.

In FIGURE 2, in which the control shaft is in the neutral position, the inlet port 9 of the central chamber also begins far at the rear of the inner dead center and ends at a short distance from the inner dead center. In FIGURE 4, because of the turn of the control shaft in the clockwise direction about the angle $\beta$, the same inlet port 9 begins at a smaller distance from the inner dead center and ends at a point beyond the inner dead center. In FIGURE 5, however, the beginning and the end of the inlet port 9 are reversed by the angle $\beta$ relative to FIGURE 2 so that they are both located at the rear of the inner dead center. The size of the displacement therefore differs since it depends upon the size of the angle $\beta$.

In FIGURE 3, the control shaft 78 is shown in the neutral control position relative to the plane of eccentricity O.T.—I.T. In FIGURE 6, however, the control shaft 78 is turned clockwise about the angle $\beta$, while in FIGURE 7 it is turned counterclockwise about the angle $\beta$. The arrow in FIGURES 3, 6, and 7 indicates the clockwise direction of rotation of the motor with its rotor and casing ring parts. These drawings show that, when the control shaft 78 is turned, the position of the outlet ports 10 of the central chamber and of the motor control ports 104 changes relative to the plane of eccentricity O.T.—I.T. In the normal position according to FIGURE 3, the outlet port 10 begins at a point shortly beyond the inner dead center and ends at a certain distance in front of it, as seen in the clockwise direction, while the motor control port 104 begins shortly in front of the outer dead center O.T. and ends shortly behind the inner dead center I.T. In FIGURE 6, however, the control shaft is turned clockwise about the angle $\beta$ and the outlet port 10 of the central chamber therefore begins accordingly at a greater distance from the inner dead center than in the normal position according to FIGURE 3. The motor control port 104 then begins and ends more forwardly in the clockwise direction in accordance with the turn of the control shaft about the angle $\beta$ and it may therefore begin far in front of the outer dead center O.T. and end, for example, in front of the inner dead center I.T. In the position according to FIGURE 7, however, the control shaft 78 is turned counterclockwise about the angle $\beta$ from the normal position according to FIGURE 3. The control port 104 thus begins shortly behind the outer dead center O.T. and ends shortly in front of the inner dead center I.T., or, if the angle $\beta$ is made very large, it may even begin at a considerable distance behind the outer dead center and end behind the inner dead center. In this manner it is possible to attain a special combustion procedure which will be later described.

Depending upon the size of the angle $\beta$ and upon whether the control shaft is turned clockwise or counterclockwise, the combustion processes will occur quite differently and the functions of the compressor, motor, control shaft, and central chamber will be extensively modified and will result in many different effects.

An example of these modifications will be hereafter described with reference to a fuel injection engine.

In this particular example, the engine should start at a low speed of only a few thousand r.p.m. or only a few hundred r.p.m. The control shaft 78 should then be turned about a large angle $\beta$ in the clockwise direction since the centrifugal force of the weights 501 at such a low speed is relatively small and is exceeded by the force of spring 506. Due to the turning of the control shaft about the angle $\beta$ in the clockwise direction, as illustrated in FIGURE 4, the compression does not begin in the compressor until the volume of the working chambers 20 already decreases slightly in front of the outer dead center O.T. During the remainder of the compression stroke, the respective work chambers cannot attain such a high compression as in the neutral position since the swept volume, i.e. the difference between the largest and smallest cubic capacity of each working chamber, which is closed during the compression stroke, is now smaller than the maximum volume. The compression occurs in those work chambers which in their rotation pass along the continuous web of the control shaft bushing 24 between the end of the induction control port 72 and the beginning of the inlet port 9 of the central chamber. Due to the smaller swept volume at a positive $\beta$, which means a turn of the control shaft in the clockwise direction from the normal position as against a negative $\beta$ which means a turn in the counterclockwise direction, the compression ratio in the compressor is relatively low and the compressed medium, either air or a mixture of fuel and air, enters with a relatively low pressure from the respective working chamber 20 through the rotor port 7 and the inlet port 9 into the central chamber 70. The number of compressions which occur during each revolution depends upon the number of working chambers 20 which are provided in the rotor. In the combustion chamber 70 the combustible mixture may be ignited or burned continuously or intermittently, or it may be supplied with additional fuel, for example, through injection nozzles 68 and 190. In most cases, the combustion will occur practically constantly in the combustion chamber 70 with only minor intermittent fluctuations since at a high number of working chambers there will be many compressions even at low speeds and the next combustion will occur before the previous combustion is completed. Depending upon the particular construction and dimensions, the combustion will occur at a constant volume and a constant pressure. If the angle $\beta$ is positive or is a very large positive angle, it will be evident from FIGURE 4 in connection with FIGURE 6 that the burning or burned gas is passed to the motor chamber 21 through the outlet port 10 of the central chamber at a time which is considerably subsequent to the innner dead center. When the respective working chamber is in this position, it has already reached a volume which is considerably larger than its minimum volume at the inner dead center. At a positive or very large positive angle $\beta$, the volume of the compressor chamber 20 which is associated with the inlet part of the central chamber will be considerably smaller than the volume of the respective motor chamber 21. Of course, at a negative angle $\beta$ the results will be the reverse.

It is thus possible to achieve that at a very large angle $\beta$ the combustion may occur in the central chamber 70 continuously at a constant pressure, as for example in a turbine. Such a combustion process is illustrated in FIGURE 9 which shows the compression diagram of such a combustion process in a combustion engine in which each motor working chamber has a maximum volume of about 100 cc. This process has the advantage that because of the continuous positive torque, a kick-back at the start in the direction opposite to the direction of rotation is rendered impossible.

The disadvantage of this process is that it occurs at relatively low pressures and therefore has a low total efficiency. As seen in general, the starting combustion process or the combustion process at a large positive angle $\beta$ corresponds approximately to the combustion process of a gas turbine, as this also appears in principle from the diagram according to FIGURE 9. Contrary to the process with a large angle $\beta$ according to FIGURE 9 which is applied for starting the engine and is hereafter called the "D-cycle," it is desirable at a higher load on the engine to attain a combustion process of a higher efficiency and a higher output of power. This purpose may be very easily attained in the engine according to the invention, for example, by simply increasing the rate of fuel supply which has the result that the engine will then rotate at a higher speed. At such a higher speed, the centrifugal force increases which acts upon the centrifugal weights 501, and as the result of this increase in speed and centrifugal force the control shaft 78 will be turned from its large positive $\beta$ position to a smaller positive $\beta$ position or to the neutral position or to a slightly negative $\beta$ position opposite to the direction of rotation of the engine. After this is done, the ratio between the volume of the motor working chamber 21 which is associated with the outlet port 10 of the central chamber and the compressor working chamber 20 which is associated with the inlet port of the central chamber will be reduced and the combustion can no longer occur completely in the central chamber 70. Furthermore, the higher speed and the resulting higher rate of flow of the gases will also prevent the occurrence of a complete combustion in the central chamber 70. Due to the smaller positive or even slightly negative angle $\beta$, the incompletely burned gases will then enter the motor chamber 21 already near the inner dead center I.T.

In the vicinity of the inner dead center, chamber 21 may then change in volume only slightly, either by increasing or reducing depending upon the position of the inner dead center. The combustion will then proceed in the closed working chamber 21 at a nearly constant or only slightly changing volume. The combustion process which then occurs corresponds approximately to the "G-cycle" in the compression diagram according to FIG. 10. It may be seen in FIGURE 10 that the compression of the medium may occur in the compressor along the compression line substantially between the points 405 and 406. Thereafter, the compression will occur partly or temporarily in the central chamber 70 at a substantially constant pressure between the points 406 and 407 of the diagram.

The combustion cannot, however, be completed in the combustion chamber if the engine speed is already so high that the flame velocity is not much higher than the rate of flow of the gases. The motor chamber 21 will therefore already be closed by the associated web of the control sleeve before the combustion is fully completed. The further combustion will therefore occur in the closed chamber 21 at a substantially constant or only slightly changing volume along the compression line between the points 408 and 409 of the diagram of the "G-cycle" according to FIGURE 10. After the maximum pressure is reached at the point 408, the pressure may proceed along the release line between the points 408 and 409. Depending upon the particular construction of the engine and upon the actual engine speed, an afterburning or a pure release may then also occur. After the release and opening of the motor control port 104, the exhaust gas escapes along the exhaust line between the points 408 and 405 of FIGURE 10.

At a somewhat similar angle $\beta$ it is also possible depending upon the particular structural values of the control and the geometrical conditions of the engine chambers, slots, control ports, etc. that a different combustion process will then occur, that is, for example, the "A-cycle" according to FIGURE 11 or the "B-cycle" according to FIG. 12.

The "A-cycle" will occur especially if the angle $\beta$ is made of such a size that the working chambers 21 of the motor will be closed already slightly before the inner dead center, which may occur especially at a small negative angle $\beta$. In such a case, a relatively quick further pressure increase and intensification or starting of the combustion will occur during the rotation in the already closed working chamber before the inner dead center and the main combustion will occur in the vicinity of the inner dead center within the particular closed working chamber 21 of the motor. It will then be possible to attain almost a constant-volume combustion substantially in accordance with the curve according to FIGURE 11, in which the compression in the compressor occurs along the compression line between the points 410 and 411 and the combustion at a nearly constant volume in the motor working chamber 21 along the combustion line between the points 411 and 412.

The release or the release and afterburning occurs thereafter along the release line between the points 412 and 413 in FIGURE 11. After the motor control port 104 opens, the exhaust gases will escape from the working chamber 21 in the manner as described, that is, along the exhaust line between the points 413 and 410 of FIGURE 11.

Depending upon the dimensions, the mixture of the medium, the type of fuel, the turbulence, the velocity of the combustion flame, the engine speed, the angle $\beta$, etc., it may, however, also occur that the combustion cannot possibly occur completely in the vicinity of the inner dead center, but that the combustion may have to continue in the motor working chamber 21 after passing the inner dead center and that at the increasing volume of the closed working chamber a further constant-pressure combustion will occur in which the release due to the combustion might occur at substantially the same speed as the work chamber increases in volume. Under such conditions, the combustion process might proceed in accordance with the "B-cycle" as shown in FIGURE 12. The compression will then occur along the compression line between the points 414 and 415. The central chamber 70 is assumed to be of a relatively small size so that the time for the flow of the gases therethrough does not permit any combustion. After the working chamber is closed before the inner dead center or in its vicinity, the combustion may occur at a practically constant volume along the combustion line between the points 415 and 416 of FIGURE 12 and thereafter because of the expansion of working chamber 21, at an almost uniform pressure along the combustion line between the points 416 and 417. Thereafter the release or the release and afterburning occur along the release line between the points 417 and 418 and then, after the motor control port 104 is opened, the exhaust of the gases occurs along the exhaust line between the points 418 and 414.

The combustion processes may be started or influenced by injection means, ignition means, filler blocks, heating blocks or heating wires in the central chamber 70 or in the working chambers 21. It may also be seen directly on the individual diagrams according to FIGURES 9 to 14 that the different adjustments result in different rates of efficiency and different rates of power.

Rotary vane combustion engines of the types as described above or as disclosed in my mentioned prior applications have the advantage that the motor working chambers 21 may be made of a very tight construction and may therefore be subjected to high pressures. A combustion engine according to the invention should therefore be operated under the highest possible pressures in order to attain a high efficiency rate substantially equal to that of a diesel engine or even higher efficiency rates. In order to attain such high pressures and efficiency rates, it is advisabe after the engine has been started at a large positive angle $\beta$, to increase the speed and at the same time either by hand or automatically to adjust the control shaft 78 to a large negative angle $\beta$.

Under these conditions it is possible to attain a combustion diagram according to the "N-cycle" as shown in FIGURE 13. If necessary, the compressor may then be made larger than the motor so that the compressor will be able to supply the central chamber 70 with a larger quantity of air or combustible mixture. In this process it is not absolutely necessary that the gases be very highly compressed in the compressor, but a preliminary compression to 2 to 20 atmospheres will be sufficient. This also permits the filler blocks 100, 101 in the compressor to be made of a relatively simple construction.

The compression within the compressor chambers proceeds along the compression line between the points 420 and 421 of FIGURE 14. Thereafter, a precombustion or partial combustion in the central chamber 70 may proceed along the combustion line between the points 421 and 422 of FIGURE 14. Thereafter the meduim may enter through the outlet port 10 of the central chamber into the working chamber 21 which, because of the large negative $\beta$, closes early before the inner dead center, that is, a condition which is reached approximately at the point 422 in the diagram according to FIGURE 14. Due to the further reduction in volume, a further compression then occurs in the particular working chamber 21 during the further rotation which proceeds along the compression line between the points 422 and 425 in FIGURE 14. If the filler blocks 100, 101 are made of the proper dimensions and the working chambers 21 are sufficiently tight, the pressure may increase along the compression line between the points 422 and 425 beyond the self-ignition temperature and may thus start or intensify the combustion which may then occur the more instantaneously the higher the compression ratio is made.

In the vicinity of the inner dead center the combustion will then occur in the motor working chamber 21 at an almost constant volume along the combustion line between the points 423 and 424 and depending upon the compression ratio, the pressure will then rise very highly until it reaches the pressure maximum approximately at the point 424. Thereafter, during the further rotation, the working chamber 21 again increases in volume and a short period of time may occur between the points 424 and 425 in which the pressure remains uniform, and thereafter the release of the afterburning and release takes place along the release line between the points 425 and 426. The exhaust of the gases takes place along the exhaust line between the points 426 and 420.

For attaining a still higher efficiency and a still higher engine output, the filler blocks 100, 101 may be made so voluminous that in the position of the inner dead center of the respective working chamber 21 of the motor, they will fill out this working chamber 21 and the rotor port 103 almost completely or so completely that a very high compression ratio will be attained. Thus, the pressure-volume diagram of the "M-cycle" according to FIGURE 13 will be attained. In this diagram, the compression in the compressor and the passage through the central chamber 70 occur along the lines between the points 430 to 431 and 431 to 432 in a similar manner as in the "N-cycle" according to FIGURE 14 between the points 420, 421 and 422. As long as the motor chamber 21 is already closed, but before it reaches the inner dead center, the further compression occurs in the motor chamber 21 along the compression line between the points 432 and 433 until it reaches a very high compression pressure of, for example, 40 to 80 atmospheres at the point 433. This high compression pressure is very important for attaining a highly accelerated combustion in the motor working chamber 21 while the latter passes in its rotation over the inner dead center. The combustion then occurs at an almost constant volume and may then reach very high combustion pressures of, for example, 80 atmospheres to over 200 atmospheres at the point 434 of the maximum combustion pressure. Thereafter, depending upon the speed conditions, the release may occur immediately or a certain combustion period may first occur at an almost constant pressure between the points 434 and 435 when the working chamber has passed the inner dead center. Thereafter the release occurs along the release line between the points 435 and 436 until, when the motor control port 104 is opened, the exhaust of the gases occurs between the points 436 and 430. The "M-cycle" according to FIGURE 13 as above described has the great advantage that the main combustion occurs at very high pressures and that it is therefore possible to attain a very high thermal efficiency and also a very high total efficiency.

A very important advantage of the combustion engine according to the invention is the fact that, with at least four but better with five or more working chambers 21 in the motor, at least one or more working chambers 21 are always active in the release process, and that the engine has therefore always a positive torque. Consequently, the rapid pressure increase up to very high pressures which may occur already prior to or in the vicinity of the inner dead center, for example, along the lines between the points 432, 433, 434 will not result in a deceleration or a sudden kickback of the engine. This advantage may also be utilized for either starting or intensifying the combustion process in the motor chamber 21 by self-ignition and without any special ignition means. Of course, the diagrams according to FIGURES 9 to 14 are mere examples. In actual practice, the curves will be considerably changed and rounded off, depending upon the particular construction and speed ratios of the engine. In any event, the engine designer has to keep in mind that the speeds of an engine according to the invention are already very high and that the absolute gas velocities through the working chambers may often be much higher than in conventional combustion engines and may approach the velocities of the gas flow in gas turbines. The engine designer must therefore rid himself of the assumption that the combustion processes will only occur relatively instantaneously as is the case in conventional piston type combustion engines. In a high-speed engine according to the invention when operating with a large negative $\beta$ angle, the individual combustion phases as described with reference to the diagrams in FIGURES 9 to 14 merge into each other because of the high rates of flow. A combustion which is already started in the compressor may extend through the entire central chamber and through the motor chamber up to the end of the release if the rotor speed is very high. Such a complete flow of the gases including the combustion may under certain circumstances occur within a few thousandths of a second and at rates of flow or absolute gas velocities between 10 and 200 m./ sec. A combustion process resulting in sharp-angular compression diagrams as in low-speed piston engines does not necessarily occur also in the combustion engine according to the invention, although it may occur if the speed of the engine is relatively low. In order to operate the new engine extremely economically, it should be designed so that the maximum pressures of the diagrams will be as high as possible. This necessarily leads to very high compression end temperatures and high combustion and total average temperatures. It is therefore necessary to cool the motor very effectively and especially the areas around the outlet port 10 of the central chamber and around the rotor port 103, since these areas are those which are subjected to the highest thermal stresses in the engine according to the invention when the same operates according to the high-pressure diagrams as shown in FIGURES 13 or 14. Also the control shaft 70 should then be cooled accordingly.

The different possible combustion processes as previously described are only to be regarded as examples since they as well as the invention itself may be modified considerably without departing from its basic scope. The adjustments of the angle $\beta$ may, for example, also be carried out by hand or by other automatic control means than those described, and especially the inlet ports 9 and the outlet ports 70 of the central chamber, the motor control ports 104, and the compressor rotor ports 7, all of which are merely illustrated in principle and by way of an example, may be of different designs in accordance with the particular structural requirements. The objects and effects of the invention may also be partly or entirely attained if in place of slot or port controls as herein described, special valve controls are provided, especially in the rotors, which are operated in a similar manner as herein described, for example, automatically in the vicinity of the inner and/or the outer dead centers and either earlier or later than at the dead centers by a distance therefrom in accordance with a positive or negative angle $\beta$.

It is therefore to be understood that my invention is not limited to the particular embodiments thereof and to the details of such embodiments as are herein described and illustrated, but that it is capable of numerous modifications within the scope of the appended claims.

Having thus fully disclosed my invention, what I claim is:

1. A rotary combustion engine comprising housing means, a rotor rotatable about an axis and having means for forming working chambers between said rotor and said housing means so that at each revolution of said rotor said working chambers periodically increase in volume between an inner dead center and an outer dead center, the position of said dead centers determining a plane of eccentricity, channels in said rotor leading to said working chambers, at least one of said channels being adapted to supply a pressure medium to said working chambers, and at least another of said channels being adapted to discharge said pressure medium from said working chambers, control body means, means for mounting said control body means so as to permit them to be turned and sealed relative to said rotor, control ports in said control body means operatively associated with said channels in said rotor so that at each revolution of said rotor relative to said control body means said control ports in said control body means and said channels in said rotor are moved alternately to and out of communication with each other, and setting means for adjusting said control body means relative to said plane of eccentricity in the direction of rotation of said rotor and in the opposite direction.

2. A rotary combustion engine as defined in claim 1 in combination with a central chamber communicating with one of said control ports in said control body means.

3. A rotary combustion engine as defined in claim 2, in which said central chamber is provided after said working chambers, as seen in the direction of flow of said pressure medium.

4. A rotary combustion engine as defined in claim 2, in which said central chamber precedes said working chambers, as seen in the direction of flow of said pressure medium.

5. A rotary combustion engine as defined in claim 2, in which said control body means comprise a central control body and said central chamber is provided at the inside of said control body.

6. A rotary combustion engine as defined in claim 1 in combination with a second rotor having channels therein, and second housing means associated with said second rotor similar to the association of said first housing means with said first rotor so as to form a second plane of eccentricity, second control body means with means for mounting said second rotor so as to permit said second control body means to be turned and sealed relative to said second rotor, said second control body means having control ports operatively associated with said channels in said second rotor so that at each revolution of said second rotor relative to said second control body means, said last ports and said channels in said second rotor are moved alternately into and out of communication with each other, said second control body means being adjustable relative to said second plane of eccentricity in the direction of rotation of said second rotor and in the opposite direction, and a central chamber communicating with one of said control ports in said first control body means and with one of said control ports in said second control body means, and means for effecting a combustion in said central chamber, said working chambers associated with said first rotor being adapted to operate as compressor chambers for said central chamber which thus functions as a combustion chamber, and said working chambers associated with said second rotor being adapted to operate as expander chambers for the combustion gases produced in said central chamber.

7. A rotary combustion engine as defined in claim 6, in which said first and second housing means together form a common housing, said first and second rotors together form a common rotatable rotor unit, and said first and second control body means together form a common control body.

8. A rotary combustion engine as defined in claim 1, in which said control body means comprise a central control body having a cylindrical outer control surface, said rotor having a cylindrical inner surface rotatable in engagement with and around said outer control surface, said central control body having a central chamber therein, said channels and control ports being also disposed in said central control body and communicating with said central chamber.

9. A rotary combustion engine as defined in claim 6, in which said first and second housing means together form a common housing, said first and second rotors together form a common rotatable rotor unit, and said first and second control body means together form a common control body, said control ports in said control body comprising a rotor inlet port for said first rotor, a rotor outlet pot for said first rotor communicating with said cental chamber and peripherally offset relative to said inlet port, a rotor inlet port for said second rotor communicating with said central chamber, and a rotor outlet port for said second rotor peripherally offset relative to said inlet port for said second rotor.

10. A rotary combustion engine as defined in claim 1, in which said control body means form an inner control body and centrally within said rotor and having channels for a cooling medium.

11. A rotary combustion engine as defined in claim 1, in which said control body means form an inner control element centrally within said rotor having a cylindrical outer surface with recesses therein and channels communicating with said recesses for supplying a pressure medium thereto for producing balancing areas.

12. A rotary combustion engine as defined in claim 1, having regulating means operative in response to a variable of the rotatable part of said engine and operatively associated with said setting means for adjusting said control body means.

13. A rotary combustion engine as defined in claim 1, having regulating means operative in response to the speed of said rotor and operatively associated with said setting means for adjusting said control body means in the direction opposite to the direction of rotation of said rotor when the rotor speed increases.

14. A rotary combustion engine as defined in claim 13, in which said regulating means comprise centrifugal weight means mounted on said rotor so as to revolve therewith and then to be movable outwardly thereof, and transmitting elements for transmitting the movement of said weight means to said setting means.

15. A rotary combustion engine as defined in claim 13, in which said housing means comprise a bearing element rotatable with said rotor, said regulating means comprising centrifugal weight means mounted on said bearing element so as to be movable at least with a radial component and having a member movable at least with an axial component when said weight means are moving in the radial direction, an axially movable thrust bearing having a rotatable bearing part operatively associated with said member, and a nonrotatable bearing part, a nonrotatable but axially movable transmitting casing, spring means adapted to oppose an axial movement of said casing caused by the centrifugal force of said weight means, toothed gear means between said casing and said setting means, said control body means comprising a central control body coaxial with said rotor, said setting means comprising a setting ring connected to said control body and operatively associated with said gear means so that, when said casing is moved in the axial direction, said setting ring and thus also said control body are moved in a rotary direction.

16. A rotary combustion engine as defined in claim 13, in which said control body means comprise a control body having a central chamber therein, at least one of said control parts forming an outlet port of said central chamber, said channels in said rotor and said control ports being associated with each other so that at low engine speeds the communication between said outlet port of said central chamber and the channels in said rotor associated with said outlet port is interrupted subsequent to the inner dead center and at high speeds before the inner dead center.

17. A rotary combustion engine as defined in claim 4, further comprising means for effecting a precompression of said pressure medium before passing to said control chamber, said control body means comprising a central body containing said central chamber, at least one of said control ports forming an outlet port of said central chamber, said channels in said rotor and said control ports being associated with each other so that at a point preceding the inner dead center said outlet port communicates with the associated channels in said rotor, whereby during the communication the pressure medium is additionally compressed in the working chambers of said rotor, and means for effecting a combustion of said pressure medium in said working chambers.

18. A rotary combustion engine as defined in claim 4, in which said control body means comprises a control body containing said central chamber and disposed centrally to said rotor, and means for producing a partial combustion within said central chamber and a further partial combustion in said working chambers of said rotor subsequent to said central chamber.

19. A rotary combustion engine as defined in claim 1, in combination with a second rotor having channels therein, and second housing means associated with said second rotor similar to the association of said first housing means with said first rotor so as to form a second plane of eccentricity, second control body means with means for mounting said second rotor so as to permit said second control body means to be turned and sealed relative to said second rotor, said second control body means having control ports operatively associated with said channels in said second rotor so that at each revolution of said second rotor relative to said second control body means, said last ports and said channels in said second rotor are moved alternately into and out of communication with each other, said second control body means being adjustable relative to said second plane of eccentricity in the direction of rotation of said second rotor and in the opposite direction, said control ports comprising an outlet control port for said work chambers of said first rotor and an inlet control port for said work chambers of said first rotor communicating with said outlet control port, so that said pressure medium may be compressed in said first rotor and then be passed in the compressed condition through said outlet control port and said inlet control port into the working chambers of said second rotor and may then be further compressed in said last working chambers.

References Cited by the Examiner

UNITED STATES PATENTS

| | | | |
|---|---|---|---|
| 1,776,504 | 9/1930 | Harper | 123—44 |
| 2,511,441 | 6/1950 | Loubiere | 60—39.61 |

MARK NEWMAN, *Primary Examiner.*

R. D. BLAKESLEE, *Assistant Examiner.*